United States Patent Office 3,356,437
Patented Dec. 5, 1967

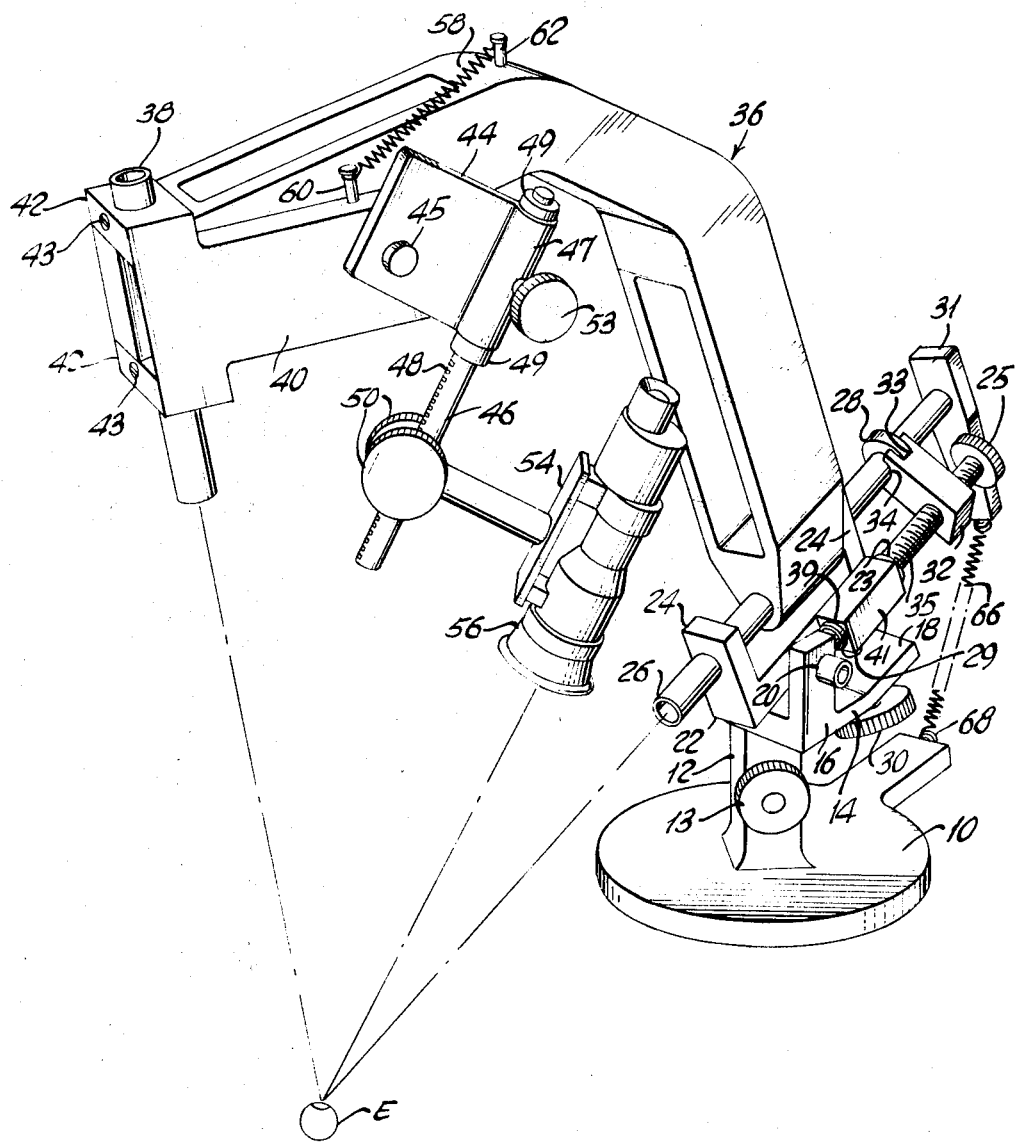

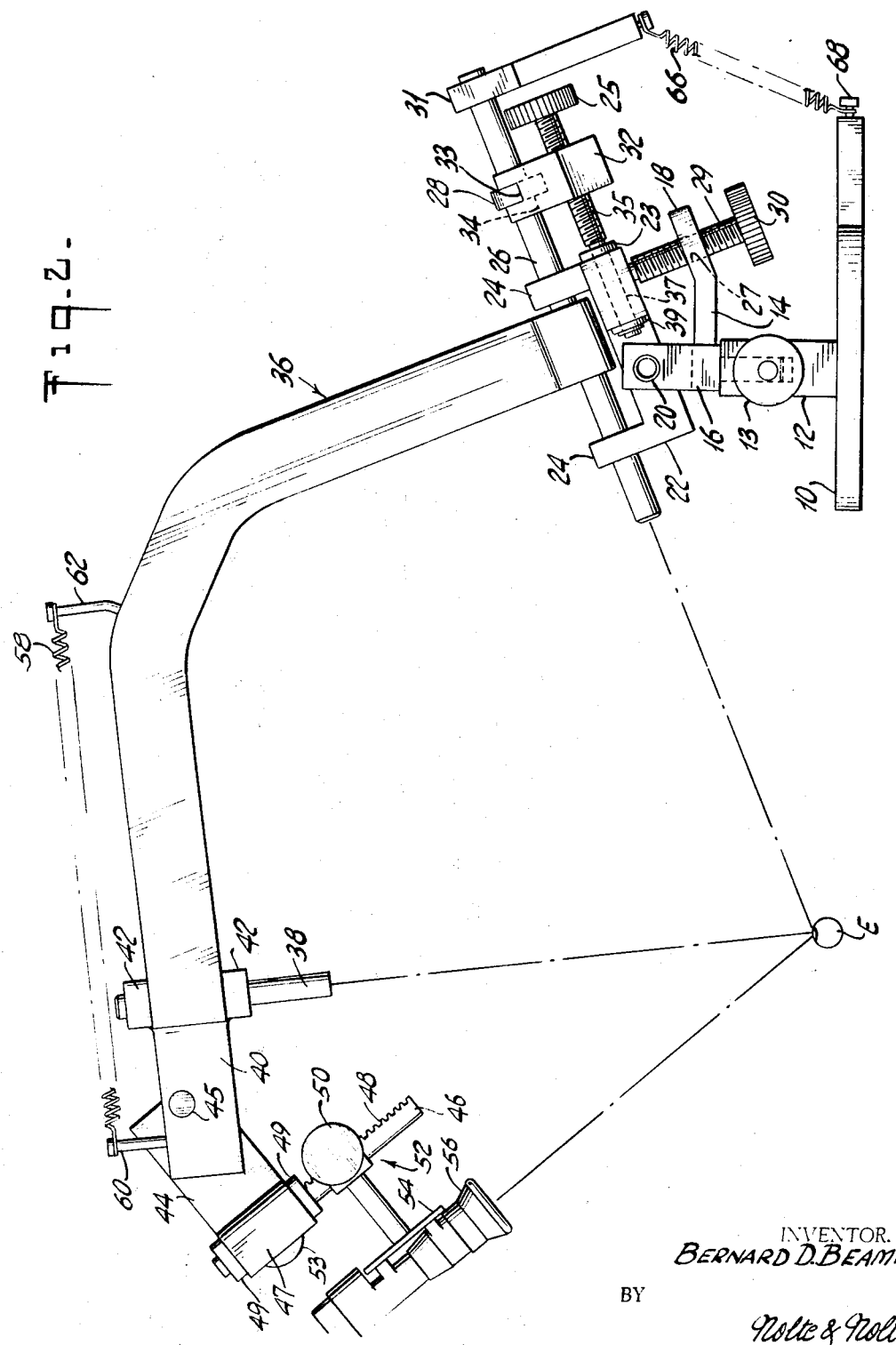

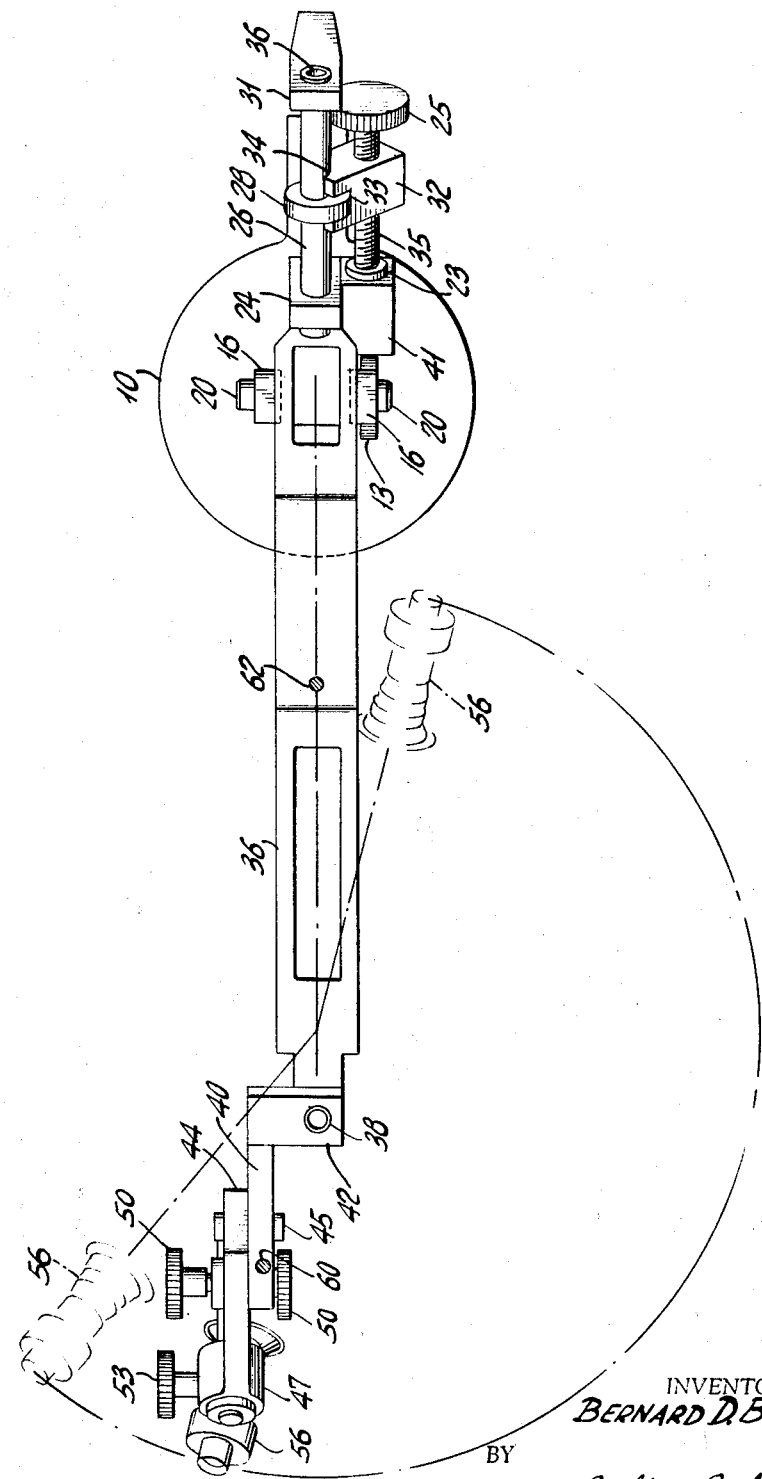

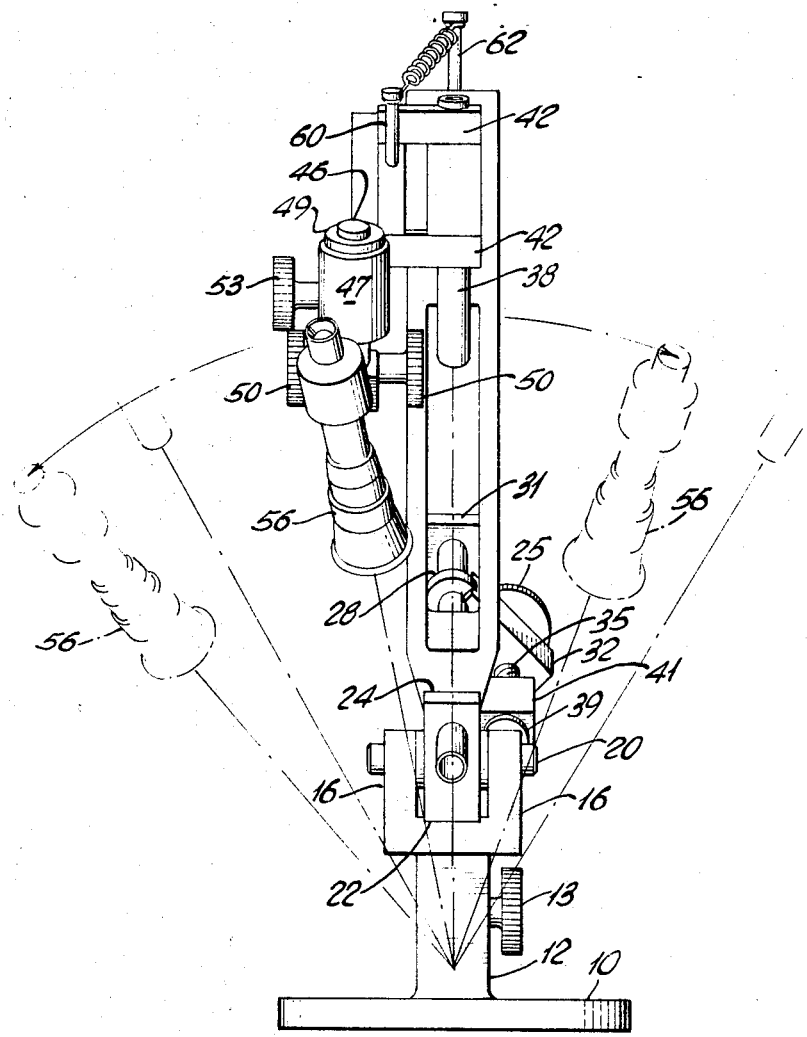

3,356,437
ADJUSTABLE MOUNTING MEANS FOR AN
OPTICAL ASSEMBLY
Bernard D. Beamish, New Rochelle, N.Y., assignor of
one-third to Albert C. Nolte, Jr., New York, N.Y.
Filed Aug. 15, 1963, Ser. No. 302,394
3 Claims. (Cl. 350—85)

This invention relates to optical assemblies and more particularly to optical assemblies which have a magnifier that is adjustably positioned with respect to an object that is being viewed.

Optical assemblies with adjustably positioned magnifiers have been found to be of considerable usefulness in surgical operations for example, but, aside from the fact that they have suffered in the past from being of rather complex structure with many moving parts that are manufactured at relatively great expense, the magnifiers of such known assemblies have at best been limited to adjustment vertically and in a horizontal plane and have required repeated readjustment and realignment with the object when shifted horizontally from their originally adjusted position, to permit for instance, viewing the object from a different angle.

Devices of this type have proven to be cumbersome when it is necessary for the surgeon to view the object from a plurality of angles. This is particularly true when it is considered that the surgeon himself must make the final realignment and refocusing at any new angle and thus find it necessary to interrupt the operation, often at critical moments.

Such devices have also proven to be unsuitable for those situations in which for example two or more surgeons are gathered about a patient who is lying on an operating table. With the known devices, an object such as the patient's eye can be viewed under magnification by one surgeon at a predetermined location beside the patient. In order to permit any of the other surgeons present to inspect the patient's eye without having to readjust and realign the magnifier with the eye of the patient, each surgeon must in turn shift his position to the predetermined location at which the magnifier was initially adjusted and aligned with the eye. If the magnifier were instead to have been moved to another location in the horizontal plane, it would then be misaligned with the eye and the surgeon would be unable to view the object in that location without first readjusting and realigning the magnifier.

It is accordingly an object of this invention to provide an optical assembly having a magnifying device that is movable through a range of positions to permit viewing the object from a plurality of angles while remaining aligned with and focused upon the object being viewed.

It is an additional object of this invention to provide an optical assembly having an angularly movable magnifying device that is adjustable along its optical axis in order to effect proper focusing without disturbing the alignment with the object being viewed.

It is a further object of this invention to provide an optical assembly which will permit an object to be observed by viewers at various locations around the object without requiring the viewers to change their locations.

It is also an object of this invention to provide an optical assembly that has relatively few moving parts and that can be easily moved by hand from one viewing position to another after having been one aligned with and focused upon the object to be viewed without requiring additional alignment or refocusing.

To this end and with these and other objects in view, the present invention pertains to an optical assembly for forming a magnified image of an object which includes an elongated bracket that is pivotable at one end about an axis that is aligned with and passes through an object. A pivot is carried by the bracket and spaced from the axis, the pivot being also axially aligned with the object so that the axis about which the bracket is pivotable and the axis of the pivot intersect at the object. A lever arm is connected to the pivot and is angularly movable with respect to the bracket through a range of positions. A magnifying device is carried by the lever arm and has an optical axis that is alignable with the object and which intersects at the object with the axis about which the bracket is pivotable and with the axis of the pivot to which the lever arm is connected, in every position of the range of positions.

In accordance with another aspect of the invention, the pivot members between the supporting basic and the bracket on the one hand and between the lever arm and the bracket on the other hand are hollow tubes through which a viewer may sight the object to be viewed and thereby align the axes of the pivots with the object.

In accordance with still other aspects of the invention, tension springs are provided for yieldably urging the lever arm into side-by-side engagement with the bracket and for yieldably urging the bracket into a substantially upright position with respect to the horizontal base plate of the supporting base.

In accordance with yet another aspect of the invention, a rack and pinion focusing mechanism is mounted on the lever arm, the magnifier being operatively connected to the pinion for travel therewith in a direction substantially parallel to the rack and along the optical axis of the magnifier.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 is a perspective view of an optical assembly constructed in accordance with the present invention;
FIG. 2 is a side elevational view of FIG. 1;
FIG. 3 is a top plan view of the optical assembly showing two other possible positions of the magnifying device in phantom; and
FIG. 4 is a front elevational view of the optical assembly showing two additional possible positions of the magnifying device in phantom.

Referring now in greater detail to the illustrated embodiment and particularly to FIGS. 1 and 2, there is shown an optical assembly for forming a magnified image of an object which comprises a support framework of components that are secured to but movable with respect to one another. The framework is carried on a flat base plate 10 of suitable diameter, thickness and weight to provide a stable support. The base plate 10 may be secured if desired by bolts or other suitable means to a supporting table (not shown) which will provide even greater stability. Although the base plate 10 is shown as being substantially circular in outline, it is of course understood that the plate may have any shape at all as long as it provides a suitable support for the framework of the optical assembly, and additionally that the entire assembly may be mounted on means other than shown herein, for example a vertically positioned floor post (not shown).

A base leg 12 extends vertically upward from the plate 10 and carries a holding member or cradle 14 at its upper end. The cradle 14 can be rigidly secured to the leg 12 or can be provided with a downwardly extending leg receivable in a cooperating bore at least partially extending downward into the leg 12, in which case the cradle 14 can be swiveled around in a substantially horizontal plane and locked into position by locking screw 13.

The cradle 14 is formed with a pair of spaced lugs 16 and an inclined wall portion 18 opposite the lugs. A tubular pivot member 20 extends through apertures formed in both lugs 16 and through a bore provided in the base of a substantially U-shaped bracket or pivot holder 22 located between the lugs 16. The legs 24 of the pivot holder 22 are formed with aligned holes through which a hollow tubular pivot member 26 extends.

Tongue 18 is provided with a tapped hole 27 through which a leveling screw 29 is fitted. The upper end of screw 29 is secured to the underside of pivot holder 22 by any suitable means. An adjusting knob 30, at one end of screw 29 allows the operator to rotate the screw clockwise or counterclockwise to respectively elevate or depress the pivot holder 22.

A collar 28 is secured to pivot member 26 by, sweating, welding, press-fitting or any other suitable means, intermediate crosspiece 31 and the rear leg 24 of pivot holder 22. A guide 32 includes a slot 33, the width of the collar, and a concave inner surface 34. The inner surface and slot of guide 32 are fitted over and engage collar 28 and pivot member 26. The collar and pivot member are free to rotate subject only to the friction of guide 32. However, since the collar is engaged by slot 33, the collar, and member 26 secured thereto, must necessarily follow the longitudinal motion of guide 32. To provide the longitudinal motion guide 32 includes a tapped hole through which an adjusting screw 35 is fitted. One end of screw 35 includes a smooth shaft portion 37 mounted in bearing 39 in block 41. Block 41 is affixed to pivot holder 22, by any suitable means, to thereby align bearing 39 with portion 37 such that they are parallel with member 26 and provide a smooth running fit for guide 32 with pivot member 26 and collar 28.

Adjusting screw 35 is provided with collars 23 at both ends of bearing 39. Thus screw 35 can rotate in the bearing but is restrained from any longitudinal movement. A knob 25 at one end of screw 35 allows an operator to rotate the screw either clockwise or counterclockwise thereby imparting a longitudinal movement to guide 32 and pivot member 26 inwardly or outwardly, respectively.

The three movements described hereinabove, i.e. the swiveling of cradle 14, the rotation of pivot holder 22 and the longitudinal adjustment of pivot member 26 allows an operator to sight pivot member 26 with eye E by elevation, depression or longitudinal movement thereof.

An elongated bent bracket 36, somewhat L-shaped in appearance, is pivotably mounted by a bore formed in one end thereof on the pivot member 26 between the legs 24 of the holder 22. Another bore is provided in the other end of the bracket 36 in which there is received a hollow tubular pivot member 38 of suitable length for the ends thereof to protrude from the bore in the bracket 36. An eccentric lever arm 40, having a pair of apertured end lugs 42, is pivotably mounted on the free end of the bracket 36, each of the protruding ends of the pivot member 38 extending through the aperture of one of the lugs 42, respectively.

When assembling the support framework of this invention, the lugs 42 of the lever arm 40 are first positioned as shown either in FIG. 1 or 2, with the apertures of the lugs 42 aligned with the bore at the end of the bracket 36. Then the tubular pivot member 38 is inserted into the aligned apertures and bore so that it protrudes from both ends thereof. Finally, set screws 43 which are provided in the lugs 42 (FIG. 1) are tightened so that they frictionally engage the pivot member 38. Thus the pivot member 38 revolves on its own axis when the arm 40 is pivoted.

A plate 44 is adjustably secured to the free end of the arm 40 by a knurled nut 45 and bolt (not shown) or any other suitable fastener. A tubular bearing 47 is attached to plate 44 and supports rod member 46. Rod member 46 includes collars 49 secured thereto at each end of bearing 47. Thus rod member 46 is free to rotate in the bearing but is restrained from longitudinal movement relative to plate 44. Knurled locking screw 53 is provided to allow the rod to be locked into radial position. A toothed rack 48 is provided lengthwise of the rod member 46, and a pinion (not shown) meshes with the rack 48 and is movable up and down the rod member 46 by suitably manipulating the knurled wheels 50 of a carrier mechanism 52. The pinion is securely connected to the wheels 50 for turning therewith in a manner well known in the art. The carrier mechanism 52 is provided with a substantially T-shaped extension 54 which is rigidly connected to an optical instrument such as the monocular magnifier 56 illustrated in the drawings.

A tension spring 58 is secured at one end to a pin 60 carried by the arm 40 and at the other end to a pin 62 carried by the bracket 36 intermediate its ends. The tension spring 58 acts to return the arm 40 to the position in which it is shown in FIG. 1, when it is pivoted on the pivot member 38, for example to the position shown in FIG. 2.

Cross-piece 31 is rigidly secured at one end of the pivot member 26 and serves as a moment arm therefor. One end of a tension spring 66 is secured to a free end of the cross-piece 31 and the other end of the spring 66 is fastened to a pin 68 carried on the base plate 10. The tension spring 66 acts to return the bracket 36 to the position in which it is shown in FIG. 1 whenever it is pivoted with the pivot member 26 to a position in which the magnifier 56 would be located in the phantom views of FIG. 4 for example. The pivot member 26 is securely held in the bore of the bracket 36 by sweating, welding or any other suitable means, and the cross-piece 31 is similarly secured to the end of the pivot member 26. Thus, the bracket 36, the pivot member 26 and the cross-piece 31 form a unified rigid structure acting as a single pivoting member.

The optical assembly constructed in accordance with the present invention is operable as follows:

The object to be viewed, such as a patient's eye E, shown diagrammatically in FIG. 1, is positioned in alignment with the axis of the hollow pivot member 26. Alignment can be assured by sighting through the hollow tubular pivot member 26 from the open end at which the cross-piece 31 is securely mounted on the pivot member 26. The eye E must also be aligned simultaneously with the axis of the hollow pivot member 38, and the viewer can similarly sight through the hollow pivot member 38 to determine whether or not the eye E is actually aligned therewith. By suitably moving base plate 10 and subsequently the entire support framework of the optical assembly and or by moving the patient the eye E can be approximately aligned with the axes of pivot member 26 and 38. For a fine adjustment, to align the eye or to realign should the patient move, cradle 14 is swiveled and locked in position by locking screw 13, pivot holder 22 is rotated about tubular pivot member 20 by adjusting knob 30, and pivot member 26 is longitudinally adjusted by utilizing adjusting knob 25. It is then a relatively simple matter to loosen the nut 45 and adjust the plate 44 so that the optical axis of the magnifier 56 is also aligned with the eye E, and then tighten the nut 45 once again. In addition locking screw 53 may be loosened to provide a simple adjustment in the other plane. The magnifier 56 can now be shifted to any and all the positions shown in the drawings and will nevertheless remain in alignment with the eye E. To focus properly or to accommodate the eyesight of viewers, the magnifier 56 can be moved along its optical axis by the rack and pinion mechanism actuated by rotating the knurled wheels 50.

As shown in FIG. 3, the arm 40 and consequently the magnifier 56 are turnable with the pivot member 38 through an angle substantially greater than a half circle.

In FIG. 4 the bracket 36 and consequently the magnifier 56 are turnable with the pivot member 26 to various positions such as shown in phantom. The angle that may be traversed is also substantially larger than a half-circle.

Since pivoting of the arm 40 on the pivot member 38 and of the bracket 36 on the pivot member 26 can take place simultaneously to varying degrees, it is self-evident that the magnifier 56 may be moved into a multiplicity of positions, yet remain optically aligned with the object being viewed.

While the invention has been illustrated and described as embodied in an optical assembly, it is not intended to be limited to the details shown since various modifications and structural changes may be made without departing in any way from the spirit of the present invention.

In this regard, attention is drawn to the fact that although the application of the invention herein is described in conjunction with viewing the eye of a patient preliminary to or during or after surgery or the like, it may have equal application in industry for inspecting small manufactured parts or portions of big parts for example, from varying angles or by different inspectors, without requiring repeated realignment of the part and the magnifier. It is also apparent that instead of directly viewing the object through the magnifier, a camera may be installed on the magnifier for photographing the magnified object for subsequent viewing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An optical assembly comprising in combination: supporting base means having a substantially horizontal base plate, first elongated pivot means carried by said base means and defining a first pivot axis, an elongated curved bracket pivotable at one end about said first pivot means, second elongated pivot means carried at the other end of said bracket and spaced from said first pivot means in fixed relationship thereto and defining a second pivot axis intersecting said first pivot axis at a point where the object to be viewed is to be placed, lever arm means connected to said second pivot means and angularly movable with respect to said bracket through a range of positions, an optical instrument pivotally connected to said lever arm means and adjustable with respect to said lever arm means, whereby the optical axis of said optical instrument can be adjusted to coincide with the point of intersection of the first and second pivot axes, adjusting means for varying the angle of inclination of said first pivot axis of said first pivot means with respect to said base plate, said adjusting means including a substantially horizontal pivot carried by said base means and pivotally supporting said bracket about an axis transverse to said first pivot axis, means supported in said base means and engaging said bracket for pivoting the same about said horizontal pivot to thereby vary the angle of inclination of said second pivot means with regard to said base plate, and means for displacing said bracket along the axis of said first pivot means.

2. An optical assembly according to claim 1 in which said pivot means are tubular members for facilitating adjustment of said axes to coincide on said point.

3. An optical assembly according to claim 1 which includes a first tension spring secured at one end to said bracket and at the other end to said lever arm means yieldably urging said lever arm means into side-by-side engagement with said bracket and a second tension spring operatively connected at one end to said bracket and secured at the other end to said horizontal base plate yieldably urging said bracket into a substantially upright position with respect to said horizontal base plate.

References Cited
UNITED STATES PATENTS

| | | | |
|---|---|---|---|
| 2,063,015 | 12/1936 | Ames | 351—13 |
| 2,879,689 | 3/1959 | Gambs | 351—1 |
| 2,967,458 | 1/1961 | Stone | 88—39 |
| 3,055,259 | 9/1962 | Dietrich | 88—39 |
| 3,180,161 | 4/1965 | Wasner | 88—39 |
| 3,201,795 | 8/1965 | Cuppers et al. | 351—38 |

DAVID H. RUBIN, *Primary Examiner.*

JEWELL H. PEDERSEN, *Examiner.*

T. H. KUSMER, J. M. GUNTHER, *Assistant Examiners.*